(12) United States Patent
Meinecke

(10) Patent No.: US 11,016,517 B2
(45) Date of Patent: May 25, 2021

(54) ON-LOAD TAP-CHANGER CONTROL METHOD, EXCITATION CONTROL SYSTEM CARRYING OUT SAID CONTROL METHOD AND POWER EXCITATION CHAIN

(71) Applicant: ALSTOM Technology Ltd, Baden (CH)

(72) Inventor: Carsten Meinecke, Karlsruhe (DE)

(73) Assignee: ALSTOM Technology Ltd, Baden (CH)

( * ) Notice: Subject to any disclaimer, the term of this patent is extended or adjusted under 35 U.S.C. 154(b) by 1937 days.

(21) Appl. No.: 13/951,501

(22) Filed: Jul. 26, 2013

(65) Prior Publication Data

US 2013/0307494 A1 Nov. 21, 2013

Related U.S. Application Data

(63) Continuation of application No. PCT/EP2012/050514, filed on Jan. 13, 2012.

(30) Foreign Application Priority Data

Jan. 31, 2011 (EP) .................................... 11152800

(51) Int. Cl.
*G05F 1/70* (2006.01)
*H02J 3/18* (2006.01)

(52) U.S. Cl.
CPC .............. *G05F 1/70* (2013.01); *H02J 3/1878* (2013.01); *Y02E 40/30* (2013.01)

(58) Field of Classification Search
CPC .................................. H02J 3/1878; G05F 1/70
USPC ........................................................... 323/205
See application file for complete search history.

(56) References Cited

U.S. PATENT DOCUMENTS 6,329,773 B1* 12/2001 Xia .......................... G02P 9/305
318/140

FOREIGN PATENT DOCUMENTS

| CN | 1311560 A | 9/2001 |
| CN | 201230214 Y | 4/2009 |
| GB | 2 410 386 | 7/2005 |

* cited by examiner

*Primary Examiner* — Jue Zhang

(57) ABSTRACT

The present invention relates to an on-load tap changer control method for a power transformer in a power system. The power transformer has a primary side for a connection to a first grid in which electric power is generated, and a secondary side for connection to a second grid in which electrical power is consumed, the power transformer being equipped with an on-load tap changer. The method includes measuring the voltage and current at least on the primary side ($u_1$, $i_1$) or on the secondary side ($u_2$ $i_2$) of the power transformer, processing said measured voltages ($u_1$; $u_2$) and currents ($i_1$; $i_2$) in order to derive prospective reactive power at the output of the power transformer after prospective tap-change, comparing prospective reactive power to a predefined set-point, and—initiating tap-change of on-load tap changer if prospective reactive power is closer to said predefined set-point than actual reactive power.

10 Claims, 5 Drawing Sheets

ON-LOAD TAP-CHANGER CONTROL METHOD, EXCITATION CONTROL SYSTEM CARRYING OUT SAID CONTROL METHOD AND POWER EXCITATION CHAIN

CROSS-REFERENCE TO RELATED APPLICATIONS

This application claims priority to PCT/EP2012/050514 filed Jan. 13, 2012, which claims priority to European Application 11152800.6 filed Jan. 31, 2011, both of which are hereby incorporated in their entireties.

TECHNICAL FIELD

The present invention relates to an on-load tap changer control method, an excitation control system carrying out said control method and a power excitation chain for regulating the reactive power flow over a power transformer equipped with an on-load tap changer (OLTC). It can be used in particular for step-up transformers equipped with OLTCs in power plants for the generation of electrical power.

BACKGROUND OF THE INVENTION

In power systems, on-load tap changers (OLTCs) are mainly employed in two applications:
  in distribution networks, they are used to keep the voltage close to its nominal value.
  in transmission networks, they are used to regulate the flow of reactive power in the system.
For example in power plants, the generators are often coupled to the transmission network through step-up transformers equipped with an OLTC.

This allows changing taps and thus the transformation ratio of the step-up transformer. It is common practice to use the OLTC to adjust indirectly the reactive power output of a generating unit when it is synchronized to the grid. The output of reactive power is often requested by the transport grid operator, and may be specified e.g. in a grid code, or on day-to-day basis.

On the other hand, it is desirable to keep the voltage on the generator terminals constant at its nominal value. This has the advantage that the generator has its full dynamic regulating capability, and the station supply that is often connected to the generator terminals is operating at nominal voltage as well.

These criteria can be met, if an automatic voltage regulator (AVR) in the excitation system of the generator maintains the generator voltage at nominal value, while the reactive power supplied to the grid is adjusted via the OLTC.

On-load Tap Changers are severe duty motor-driven switching systems, requiring arcing contacts and bypass contacts to ensure continuity while switching from one tap to another. The voltage change from one tap to another is typically less than 1%, and OLTCs have quite several tens of taps to provide a reasonable range of operation.

The control of OLTCs of power transformers is today commonly done automatically upon voltage measurements on the output side of the power transformer, employing an automatic voltage regulator associated to the OLTC.

However, if the reactive power flow is controlled, this can only be done indirectly via voltage regulation, and the reference value for the voltage regulator has to be set manually in a try-and-see approach by the operator staff, until the specified reactive power output to the grid is achieved. As soon as the grid condition or the operating regime of the generator changes, the reference value has to be re-adjusted manually.

This known solution is not satisfying.

SUMMARY

One object of the present invention is to simplify the overall power generation chain and to propose a more secure solution allowing to avoid manual adjustment of a voltage reference value of the automatic voltage regulator of the OLTC.

This is achieved by an on-load tap changer control method for a power transformer in a power system, where the power transformer has a primary side for a connection to a first grid in which electric power is generated, and a secondary side for connection to a second grid in which electrical power is consumed, the power transformer being equipped with an on-load tap changer,
    said method comprising the following steps:
    measuring the voltage and current at least on the primary side or on the secondary side of the power transformer,
    processing said measured voltages and currents in order to derive prospective reactive power at the output of the power transformer after prospective tap-change,
    compare prospective reactive power to a predefined set-point,
    initiate tap-change of on-load tap changer if prospective reactive power is closer to said predefined set-point than actual reactive power.

Therefore, in using the reactive power output as control variable, manual re-adjustment of the reference value by an operator is obsolete.

According to further aspects of the invention take alone or in combination:

According to a further aspect, processing said measured voltages and currents in order to derive prospective reactive power at the output of the power transformer after prospective tap-change takes into account the grid reactance and the internal grid voltage of said grid where electrical power is consumed.

The method takes into account actual values of the grid reactance and the internal grid voltage and calculates using both, actual and historic or memorized values of said measured voltages and currents and other electrical quantities derived thereof.

According to another aspect, a further step of detection of change of an operation point of the power transformer, and where said steps of processing, comparison and control are carried out when a change of operation point is detected.

Said further step of detection of change of an operation point of the power transformer might comprise to detect stepping of the OLTC.

According to another embodiment, said further step of detection of change of an operation point of the power transformer comprises to detect a variation beyond a predefined range of the internal electromotive force e.m.f. of the power transformer.

In case where the said primary grid comprises a synchronous generator and an excitation system with an automatic voltage regulator, said change of the internal electromotive force (e.m.f.) of the power transformer is for example detected by detecting a change in the reference value of the automatic voltage regulator of the generator.

Moreover, it might be foreseen a further step of altering temporarily and slightly the reference voltage of the generator automatic voltage regulator for producing a change of internal electromotive force e.m.f. of the power transformer.

The step of altering the reference voltage of the generator automatic voltage regulator may last at most for some seconds and said alteration of the reference voltage is less than 1% of the rated value, preferentially 0.5%.

In case where the first grid comprises a power excitation chain having a generator, and where the power transformer is a step-up transformer equipped with an on-load tap changer and connected on the one hand to the output of said generator and on the other hand to a transmission bus, said measured voltage and current are for example respectively the generator voltage and generator current.

The invention also relates to an on-load tap changer control unit for a power transformer in a power system, where the power transformer has a primary side for a connection to a first grid in which electric power is generated, and a secondary side for connection to a second grid in which electrical power is consumed, the power transformer being equipped with an on-load tap changer, wherein said unit comprises means configured to
- measure the voltage and current at least on the primary side or on the secondary side of the power transformer,
- process said measured voltages and currents in order to derive prospective reactive power at the output of the power transformer after prospective tap-change,
- compare prospective reactive power to a predefined set-point,
- initiate tap-change of on-load tap changer if prospective reactive power is closer to said predefined set-point than actual reactive power.

The invention may further relate to an excitation control system for a power excitation chain said power excitation chain comprising
- a generator,
- a step-up transformer equipped with an on-load tap changer and connected on the one hand to the output of said generator and on the other hand to a transmission bus,
- the excitation control system comprising
  - at least one input connectable to the generator for measuring the generator voltage and generator current, and
  - at least one processing unit to control the excitation of the generator as a function of the measured generator voltage and generator current,
- wherein
  - said at least one processing unit is connectable to said on-load tap changer and is furthermore configured to derive from said measured generator voltage and generator current the reactive power output of said step-up transformer for controlling said on-load tap changer.

According to another aspect, where a station supply transformer is connected between the generator and the step-up transformer, said at least one processing unit is connectable to said on-load tap changer and is furthermore configured to take into account active and reactive power measured at the terminals of the step-up transformer and/or active and reactive power measured at the terminals of the station supply transformer when deriving from said measured generator voltage and generator current said control parameter for controlling said on-load tap changer.

Finally, the invention relates to a power excitation chain comprising
- a generator,
- a step-up transformer equipped with an on-load tap changer and connected on the one hand to the output of said generator and on the other hand to a transmission bus, and
- an excitation control system as defined above.

DETAILED DESCRIPTION

Figure 1:
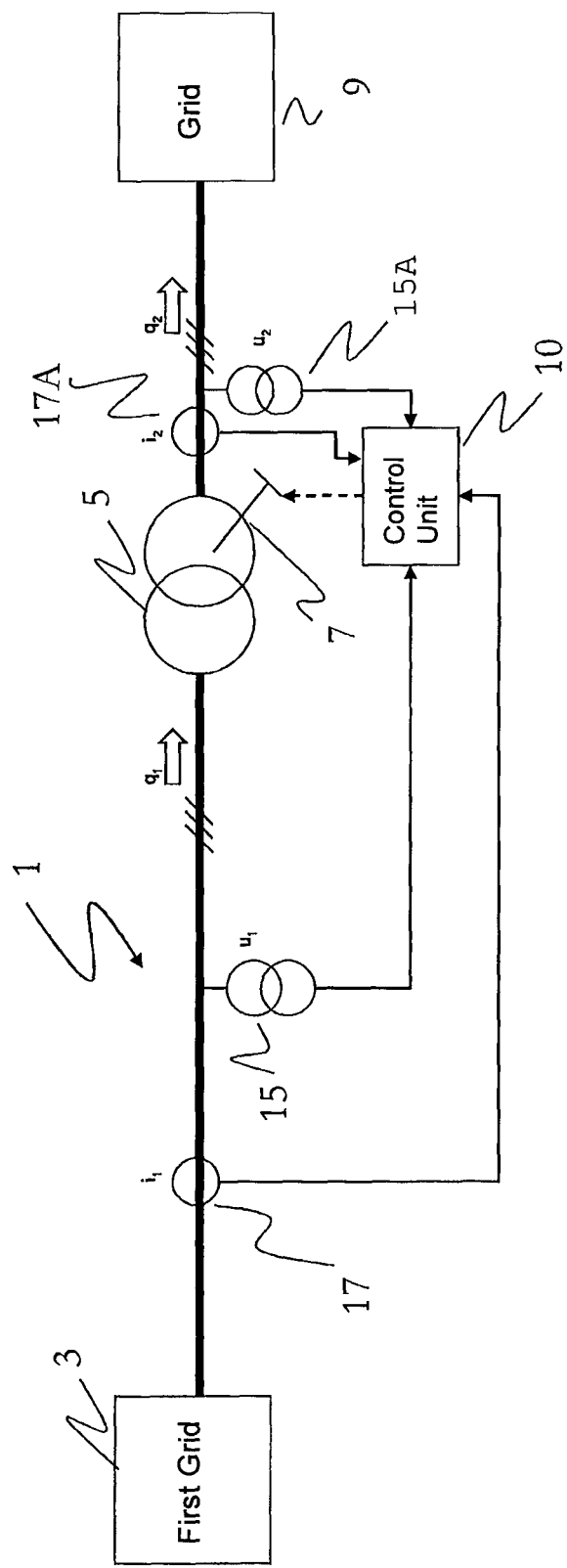
FIG. 1 is a schematic representation of a power transformer, equipped with an OLTC

In all figures, same reference numerals refer to the same elements.

FIG. 1 is a schematic representation showing a first grid 3 in which electric power is generated connected to the primary side of a power transformer 5, equipped with an on-load tap changer OLTC 7.

The secondary side of the power transformer 5 is connected to a second grid 9 in which electrical power is consumed.

The flow of power is counted positive from the primary to the secondary side of the power transformer 5.

The power transformer is connected to an associated OLTC regulator and control unit 10.

Said OLTC regulator and control unit 10 is configured to measure the voltage and current on the primary side $u_1$, $i_1$ or on the secondary side $u_2$ $i_2$ of the power transformer or on both, the primary side $u_1$, $i_1$ and on the secondary side $u_2$, $i_2$ of the power transformer 5.

As shown in FIG. 1, said OLTC regulator and control unit 10 has inputs that are respectively connected to measurement units 15, 17 (for example instrument transformers or Rogowski coils) for measuring the voltage $u_1$ and current $i_1$ on the primary side of the power transformer 5 and measurement units 15A, 17A (for example instrument transformers or Rogowski coils) for measuring the voltage $u_2$ and current $i_2$ on the secondary side of the power transformer 5.

The solution in FIG. 1 is the most complete solution as both primary and secondary voltage and current measurements are done. However, in a quite simpler version, either measurements on the primary or the secondary side are done.

The OLTC regulator and control unit 10, which may be a calculator, a computer or part of a computer, is configured
- to process said measured voltages $u_1$ and/or $u_2$ and currents $i_1$ and/or $i_2$ in order to derive prospective reactive power $q_2$ at the output of the power transformer 5 after prospective tap-change,
- to compare prospective reactive power to a predefined set-point, and
- to initiate tap-change of on-load tap changer 7 if prospective reactive power is closer to said predefined set-point than actual reactive power.

Figure 2:
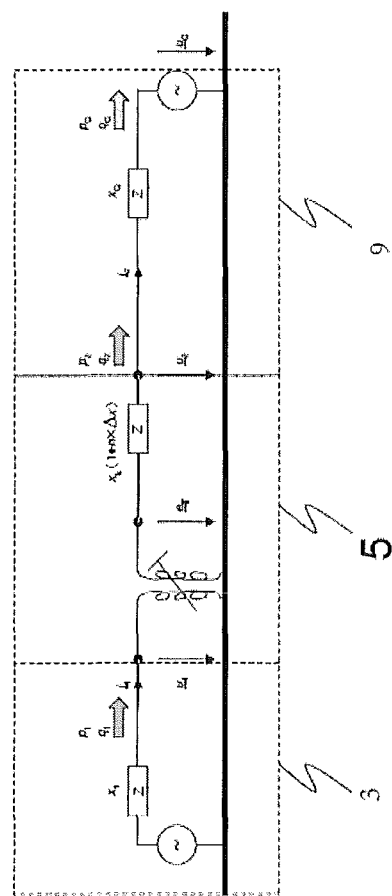
FIG. 2 is an equivalent electric circuit scheme of the configuration shown in of FIG. 1, FIGS. 3a and 3b are schematic representations of the specific application where the power transformer is a step-up transformer with OLTCs in a power plant.

This will be explained in detail with respect to FIG. 2 which shows an equivalent electric circuit scheme of the components shown in FIG. 1 for explanation purposes.

The symbols in this figure denoting electrical quantities are used in the calculations below.

The control parameter is the reactive power $q_2$ provided to the grid 9 in which electrical power is consumed.

$u_2$ and $q_2$ can not change continuously, but only in discrete steps according to the resolution of the tap-changer. A tap-change command will be given only, if the prospective quantity after stepping, $\underline{q}_2(n\pm1)$, will be closer to the setpoint than the actual quantity at, i.e. $\underline{q}_2(n)$.

Hence, the prospective value after stepping higher or lower, $\underline{q}_2(n\pm1)$, must be known for the regulator algorithm. However, $\underline{q}_2(n\pm1)$ depends on the tap-changer position, the actual load flow over the power transformer 5, and the condition of the grid 9 in which electrical power is consumed.

As can be seen on FIG. 1, the measured actual values of voltage and current may be measured either on the primary side of the step-up transformer 5 or on the secondary side. In the first case, the quantities on the secondary side of the power transformer 5 have to be derived from calculation.

The tap-changer position is known from a feedback signal of the OLTC 7, and the load flow can be directly derived from the measured voltage and current by conventional calculation.

However, the determination of the condition of the grid 9 on the consumer side, that is characterised by the internal ideal voltage $u_Q$ and a series reactance $x_Q$, requires a more complex algorithm.

For the calculations, following quantities are defined:
index 1 quantity on primary side of transformer
index 2 quantity on secondary side of transformer
index Q quantity of grid or transmission bus model
$\underline{u}_i$ complex voltage value
$\underline{i}_i$ complex current value
$\underline{e}_T$ electromotive force (e.m.f.) of step-up transformer
$p_i$ active power value
$q_i$ reactive power value
$\Delta u$ voltage variation by one tap change
$\Delta x$ impedance variation by one tap change
n position of tap changer Furthermore, it is assumed that:
resistances are neglected→active power is constant throughout model: $p_1=p_2=p_Q=p$
all values in p.u.
the internal grid voltage $u_Q$ is not influenced considerably by the tap-changer position of the transformer under consideration,
the active power p is not influenced considerably by the tap-changer position of the transformer under consideration.

The quantities to be calculated concern:
the grid/transmission bus condition that is defined by the virtual internal grid voltage $u_Q$, and the grid reactance $x_Q$
the quantities on secondary side of step-up transformer at actual tap changer position n
  e.m.f. $e_T(n)$
  current $i_2(n)$
  reactive power $q_2(n)$
quantities on secondary side of step-up transformer at tap changer position $n\pm1$
  e.m.f. $e_T(n+1)$, $e_T(n-1)$
  current $i_2(n+1)$, $i_2(n-1)$
  reactive power $q_2(n+1)$, $q_2(n-1)$ Available parameters and values are
from measurement:
  complex actual values of voltage and current on primary or secondary side of the transformer, $\underline{u}_1$ and $\underline{i}_1$, or $\underline{u}_2$ and $\underline{i}_2$, respectively
  active and reactive power on primary or secondary side of the transformer, $p_1$ & $q_1$, or $p_2$ & $q_2$, respectively (with assumption $p_1=p_2=p$)
system parameters
  transformer reactance $x_k$
  variation of e.m.f. with one tap change, $\Delta u$
  variation of $x_k$ with one tap change, $\Delta x$
position of tap changer, n, for example by feedback signal via the plant control system.

In the following calculations, the position of the tap-changer, n, is scaled such that n=0 denotes the middle position of the tap-changer, n>0 results in a higher e.m.f., n<0 results in a lower e.m.f.

With $\underline{e}_T$ defining the real axis, complex electromagnetic calculation yields (all values in p.u.)

$$\underline{e}_T(n)=\underline{u}_1\times(1+n\times\Delta u)$$

and $$q_2(n)=q_1(n)-x_k(n)\times i_2(n)^2$$

with $\underline{i}_2(n)=\underline{i}_1/(1+n\times\Delta u)$ and j being the imaginary number The prospective reactive power output after stepping the OLTC one step up or down can be calculated using the formula $$q_1(n\pm1) = \frac{e_T^2(n\pm1)}{X_k(n\pm1)+X_Q} - \sqrt{\frac{u_q^2}{(X_k(n\pm1)+X_Q)^2}\cdot e_T^2(n\pm1)-p^2}$$

From $q_1(n\pm1)$, the prospective reactive power on the secondary side of the transformer can be calculated:

$$q_2(n\pm1)=q_1(n\pm1)-x_k(n\pm1)\times i_2^2(n\pm1) \text{ Änderung beachten: "}x\text{"-Zeichen}$$

With $$i_2(n\pm1) = \frac{s_1(n\pm1)}{e_T(n\pm1)}$$

As to be seen in the above formula for $q_1(n\pm1)$, the values $x_Q$ and $u_Q$, that characterise the condition of the grid on the secondary side of the transformer, must be available. The internal voltage $u_Q$ can be derived using $$u_Q^2 = e_T^2(n) - 2q_1(n)\times(x_k(n)+x_Q) + \frac{s_1^2\times(x_k(n)+x_Q)^2}{e_T^2(n)}$$

with $s_1^2=\underline{e}_T^2(n)\times i_T^2(n)=p_1^2+q_1^2$

The grid reactance $x_Q$ for grid 9 on the consumer side can not be calculated directly from the instantaneous measured values. Instead, two sets of values at two different operating points are used, an actual and a former operation point.

The two operating points are characterized by different values of the internal e.m.f. of the transformer, $\underline{e}_T$. If for an actual and a former operation point the internal e.m.f. of the transformer is equal or less than a specific limit, the grid reactance $x_Q$ is assumed to be the same for both operation points.

The algorithm to derive $x_Q$ is as follows, where the index mem denotes a former value stored for example in a memory during a former calculation step, and the index actual denotes measured actual values:

actual values of $\underline{u}_1$ & $\underline{i}_1$ and/or $\underline{u}_2$ & $\underline{i}_2$ are measured at a given operating point, derived quantities $e_T$, $q_1$ and $i_2$ are calculated and stored in memory, if a new operating point is detected, i.e. $|e_{T,actual} - e_{T,mem}|$ exceeds a specified limit, the grid reactance $x_Q$ is calculated, using the following formula:

$$x_Q = \frac{q_{1,actual} - q_{1,mem}}{i_{2,actual}^2 - i_{2,mem}^2}\left(1 - \sqrt{1 - \frac{(e_{T,actual}^2 - e_{T,mem}^2)(i_{2,actual}^2 - i_{2,mem}^2)}{(q_{1,actual} - q_{1,mem})^2}}\right) - x_k(n)$$

The internal e.m.f. of the transformer may change due to
    stepping the OLTC
    a change of $u_1$
Hence, the grid reactance $x_Q$, will be calculated at least at each time the OLTC is operated.

The detection of a change of operation point initiates the storage of the voltages $u_1$; $u_2$, currents $i_1$; $i_2$ and derived electrical quantities in a memory and the calculation of said grid reactance $x_Q$.

An alternative method for determining the grid condition can be realized, where in a similar way a formula is established that allows for computing the grid reactance $u_Q$ based on a set of available measured values and quantities stored in memory, and a corresponding equation for computing the grid reactance $x_Q$, that contains the grid voltage $u_Q$. The algorithm is then as follows:

actual values of $\underline{u}_1$ & $\underline{i}_1$ and/or $\underline{u}_2$ & $\underline{i}_2$ are measured at a given operating point, derived quantities $e_T$, $q_1$ and $i_2$ are calculated and stored in memory, if a new operating point is detected, i.e. $|e_{T,actual} - e_{T,mem}|$ exceeds a specified limit, the grid voltage $u_Q$ is calculated.

In applications of the method in power generating units, the calculation of the grid reactance can be triggered also by temporarily slightly altering the reference voltage of the automatic voltage regulator of the generator, $AVR_G$, e.g. by 0.5% for some seconds. This does not affect the operation of the unit, and results in the desired change in $e_T$.

Thus, only in measuring available electrical quantities on either the primary or secondary side of the transformer, and using appropriate programming and calculation as described above, it is possible to establish an optimal OLTC regulator and control unit 10 with the reactive power output of the transformer as control variable.

Figure 3A:
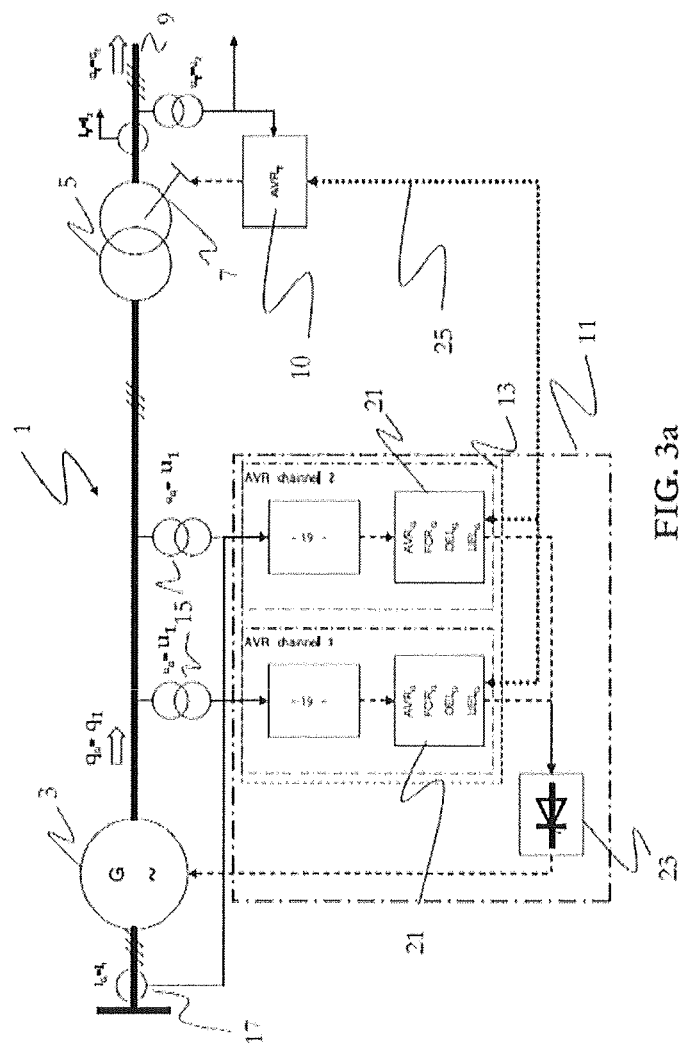
Figure 3B:
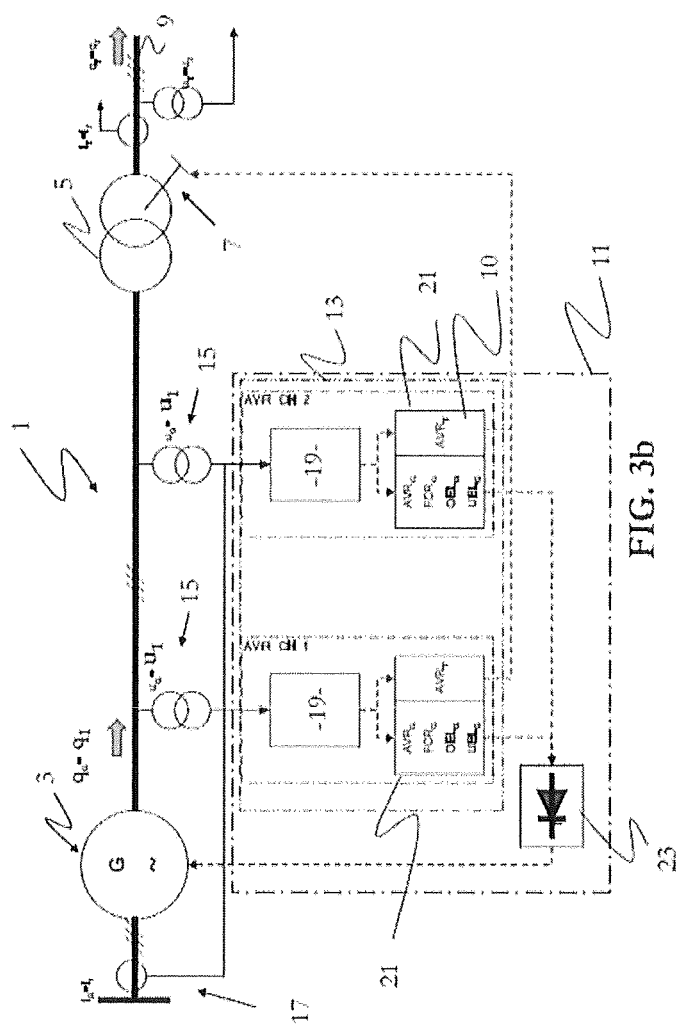

FIGS. 3a and 3b are schematic representations of a part of a typical power excitation chain 1, for example implemented in a power plant.

In this case, the grid 3 where electrical power is generated comprises a generator G transforming mechanical energy into electrical energy. The generator G may be driven by not represented turbines or engines fed by any available energy source or combination of energy sources (coal, fuel, gas, nuclear, steam, wind, water, sun, hydrological etc). The generator may be a synchronous generator.

The output of the generator G is connected to the power transformer realized as a step-up transformer 5 equipped with an on-load tap changer (OLTC) 7 and an associated OLTC regulator and control unit 10.

The output of the step-up transformer 5 is connected to a grid 9 where electrical power is consumed which might be in this case a transmission bus connected to the public grid.

The power excitation chain 1 further comprises a generator excitation control system 11.

This generator excitation control system 11 comprises a processing unit 13 with at least one, but for availability reasons preferentially two redundant automatic voltage regulation channels AVR CH1 and AVR CH2.

AVR CH1 and AVR CH2 have inputs that are respectively connected to measurement units 15, 17 (for example instrument transformers or Rogowski coils) for measuring the generator voltage $u_1 = u_G$ and generator current $i_1 = i_G$ which represent voltage and current on the primary side of the power transformer 5.

AVR CH1 and AVR CH2 comprise a signal processing unit 19 configured for example to filter the measurement signals, to convert them from analogue to digital values, and to calculate derived quantities, such as active and reactive power, power factor etc.

The digital values out of said signal processing unit 19 are fed into respective calculation processing units 21.

Such a calculation processing unit 21 is at least configured and programmed as a generator automatic voltage regulator $AVR_G$. It may comprise further functions, such as a generator field current regulator $FCR_G$, a generator over-excitation limiter $OEL_G$ and a generator under-excitation limiter $UEL_G$, an over-fluxing limiter, or a power system stabilizer.

These calculation processing and control units 21 are then connected to a power section 23 for controlling the power section 23 and therefore excitation of the generator G in function of the measured generator voltage $u_G$ and generator current $i_G$.

Such a calculation processing unit 21 may be a computer or a microprocessor based calculation unit.

The co-ordination of the generator excitation control and the OLTC control may require a data exchange line 25 via an interface between the processing units 21 and the OLTC regulator and control unit 10.

As shown in FIG. 3a, the OLTC regulator and control unit 10 is a separate control unit or a stand alone solution.

With reference to FIG. 3b, part of the processing unit 21 can also be used and configured as an on-load tap changer regulator and control unit 10. In this case, unit 21 is therefore connected to said on-load tap changer 7, and the data exchange between the excitation control function and the OLTC control function is provided within the processing units 21.

Furthermore, as already described above with reference to FIGS. 1 and 2, OLTC regulator and control unit 10 is configured to derive from said measured generator voltage $u_G$ and generator current $i_G$ the reactive power $q_T$ provided to the transmission bus and/or the grid for controlling said on-load tap changer 7 of the step-up transformer 5 and are connected to said on-load tap changer 7.

This is achieved in applying the same calculations as those described with reference to FIGS. 1 and 2, by replacing indexes 1 and 2 respectively by G (for generator—which is connected to the primary side of the power transformer 5) and T (for the secondary side of the power transformer 5).

The control parameter is the reactive power $q_T$ provided to the transmission bus and/or the grid.

As already stated $u_T$ and $q_T$ can not change continuously, but only in discrete steps according to the resolution of the tap-changer. A tap-change command will be given only, if the prospective quantity after stepping, $q_T(n\pm 1)$, will be closer to the setpoint than the actual quantity at, i.e. $q_T(n)$. Hence, the prospective value after stepping higher or lower, $q_T(n\pm 1)$, must be known for the regulator algorithm. However, $q_T(n\pm 1)$ depends on the tap-changer position, the actual load flow over the transformer, and the condition of the transmission grid.

As can be seen on FIGS. 3a, 3b, the measured actual values of voltage and current may be measured on the generator terminals, i.e. on the primary side of the step-up transformer 5.

If so, the quantities on the secondary side of the transformer have to be derived from calculation.

The tap-changer position is known from a feedback signal of the OLTC, and the load flow can be directly derived from the measured voltage and current by conventional calculation. However, the condition of the transmission grid, that is characterised by the internal ideal voltage $u_Q$ and a series reactance $x_Q$, requires a more complex algorithm.

For the calculations, following quantities are defined:
index 1 or G quantity on primary side of transformer
index 2 or T quantity on secondary side of transformer
All other quantities are the same as above described and the same assumptions are made.

In the present case, the internal e.m.f. of the power transformer 5 may change due to
stepping the OLTC
a change in the generator terminal voltage, $u_G$ Hence, the grid reactance $x_Q$, will be calculated at least at each time the OLTC is operated.

In applications of the method in power generating units, the calculation of the grid reactance can be triggered also by temporarily slightly altering the reference voltage of the automatic voltage regulator of the generator, $AVR_G$, e.g. by 0.5% for some seconds. This does not affect the operation of the unit, and results in the desired change in $e_T$.

Thus, only in measuring available electrical quantities on either the primary or secondary side of the transformer, and using appropriate programming and calculation as described above, it is possible to establish an optimal OLTC regulator with the reactive power output of the transformer as control variable.

In power plants, the proposed regulator can be implemented as an additional software function in the existing automatic voltage regulator of the generator, $AVR_G$. In the $AVR_G$, the actual values of the electrical quantities on the primary side of the power transformer are available. An individual OLTC regulator for the on-load tap-changer equipped step-up transformer is then no longer necessary and saves costs. In addition, engineering, commissioning and maintenance costs can be reduced.

It should be noted that there is no need to have a considerably more performant microprocessor to carry out the calculations as described above, as the time basis for generator voltage regulation and OLTC regulation are quite different. Indeed OLTC regulation is by at least one order of magnitude slower than the generator voltage regulation.

Figure 4:
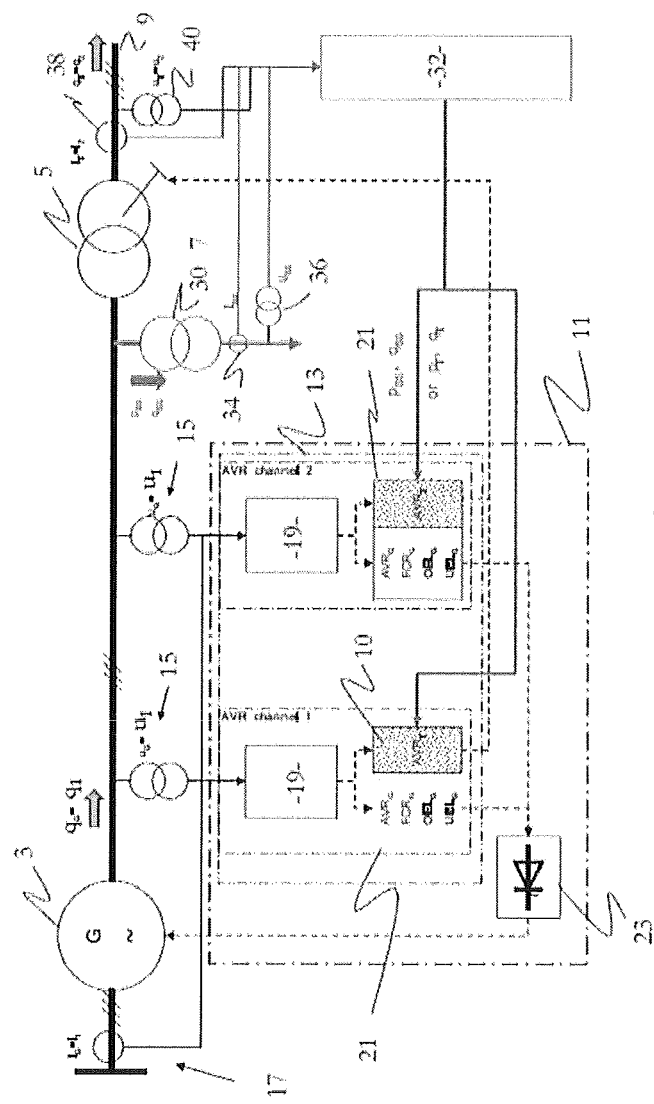
FIG. 4 is a schematic representation of an alternative embodiment of a part of a power excitation chain according to the invention.

FIG. 4 shows an alternative embodiment of the power excitation chain of FIGS. 3a and 3b.

This embodiment differs from that of FIGS. 3a and 3b in that a station supply transformer 30 is connected between the generator G and the step-up transformer 5.

Such a station supply transformer 30 is used in a power plant to satisfy the electrical energy consumption of the power plant.

In FIG. 4 is also represented the plant control system 32 that is connected to measurement units 34, 36 and 38, 40 for measurement of the station supply transformer secondary current $i_{SS}$, station supply transformer secondary voltage $u_{SS}$, step-up transformer secondary current $i_T$, and step-up transformer secondary voltage $u_T$.

In this case, the OLTC regulator function 21 is furthermore configured to take into account active and reactive power measured at the terminals of the step-up transformer ($p_T$, $q_T$) and/or active and reactive power measured at the terminals of the station supply transformer ($p_{SS}$, $q_{SS}$) when deriving from said measured generator voltage and generator current said control parameter for controlling said on-load tap changer in an analogous way as described above. The algorithm described above has then to be modified e.g. such, that the values of active and reactive power measured at the terminals of the station supply transformer ($p_{SS}$, $q_{SS}$) have to be subtracted from the active and reactive power measured at the generator terminals ($p_G$, $q_G$).

As already described in detail in relation to FIGS. 3a and 3b and 4, the present invention also relates to a power excitation chain 1 and to an excitation control system 11 for such a power excitation chain 1 where upon measured generator voltage $u_G$ and generator current $i_G$, the reactive power output of the step-up transformer 5 is used for controlling the OLTC 7.

What is claimed is:

1. An on-load tap changer control method for a power transformer in a power system, wherein the power transformer has a primary side for a connection to a first grid in which electric power is generated, and a secondary side for connection to a second grid in which electrical power is consumed, the power transformer being equipped with an on-load tap changer, said method comprising:
measuring the voltage and current at least on the primary side ($u_1$, $i_1$) or on the secondary side ($u_2$, $i_2$) of the power transformer,
processing said measured voltages ($u_1$; $u_2$) and currents ($i_1$; $i_2$) in order to derive prospective reactive power at the output of the power transformer after prospective tap-change,
comparing prospective reactive power to a predefined set-point,
controlling tap-change of on-load tap changer if prospective reactive power is closer to said predefined set-point than actual reactive power.

2. The on-load tap changer control method according to claim 1, wherein processing said measured voltages ($u_1$; $u_2$) and currents ($i_1$; $i_2$) in order to derive prospective reactive power at the output of the power transformer after prospective tap-change takes into account the grid reactance ($x_Q$) and the internal grid voltage ($u_Q$) of said grid where electrical power is consumed.

3. An on-load tap changer control method according to claim 1, further comprising a further step of detection of change of an operation point of the power transformer, and wherein the detection of a change of operation point initiates the calculation of said parameters representing the grid condition ($x_Q$, $u_Q$), based on a set of actual and historical electrical quantities, wherein the historical quantities are stored in memory.

4. An on-load tap changer control method according to claim 3, wherein detection of change of an operation point of the power transformer comprises to detect a variation beyond a predefined range of the the internal electromotive force ($e_T$) of the power transformer.

5. An on-load tap changer control method according to claim 4, wherein said change of the internal electro-motive force ($e_T$) of the power transformer is detected by detecting stepping of the OLTC.

6. An on-load tap changer control method according to claim 4, wherein the said primary grid comprises a synchronous generator and an excitation system with an automatic voltage regulator ($AVR_G$), where said change of the internal electro-motive force (e.m.f.) of the power transformer is detected by detecting a change in the reference value of the automatic voltage regulator of the generator ($AVR_G$).

7. An on-load tap changer control method according to claim 6, further comprising altering temporarily and slightly the reference voltage of the generator automatic voltage regulator ($AVR_G$) for purposely producing a change of internal electromotive force e.m.f. of the power transformer.

8. The on-load tap changer control method according to claim 7, wherein altering the reference voltage of the generator automatic voltage regulator ($AVR_G$) lasts at most for some seconds and where said alteration of the reference voltage is less than 1% of the rated value, preferentially 0.5%.

9. The on-load tap changer control method according to claim 1, wherein the first grid comprises a power excitation chain having a generator (G), and where the power transformer is a step-up transformer equipped with an on-load tap changer and connected on the one hand to the output of said generator (G) and on the other hand to a transmission bus, where said measured voltage and current are respectively the generator voltage ($u_G$) and generator current ($i_G$).

10. An on-load tap changer control unit for a power transformer in a power system, wherein the power transformer has a primary side for a connection to a first grid in which electric power is generated, and a secondary side for connection to a second grid in which electrical power is consumed, the power transformer being equipped with an on-load tap changer, wherein said unit comprising means to measure the voltage and current at least on the primary side ($u_1$, $i_1$) or on the secondary side ($u_2$ $i_2$) of the power transformer, means to process said measured voltages ($u_1$; $u_2$) and currents ($i_1$; $i_2$) in order to derive prospective reactive power at the output of the power transformer after prospective tap-change, means to compare prospective reactive power to a predefined set-point, initiate tap-change of on-load tap changer if prospective reactive power is closer to said predefined set-point than actual reactive power.

* * * * *